(No Model.)
J. E. AMENT.
CAR COUPLING.
No. 508,797.
Patented Nov. 14, 1893.
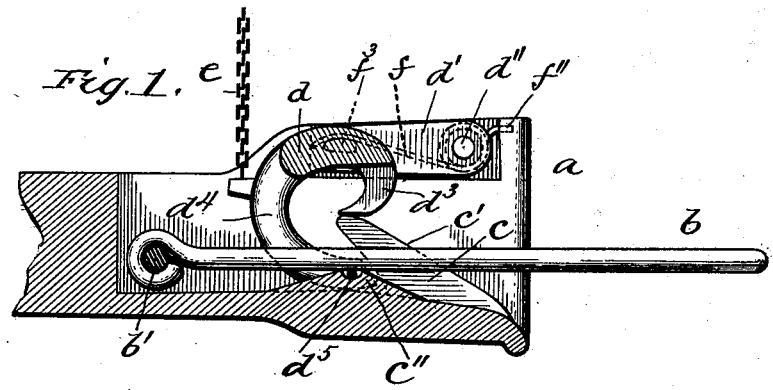
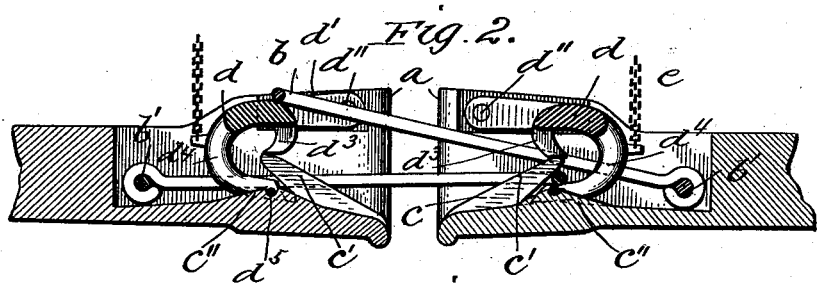
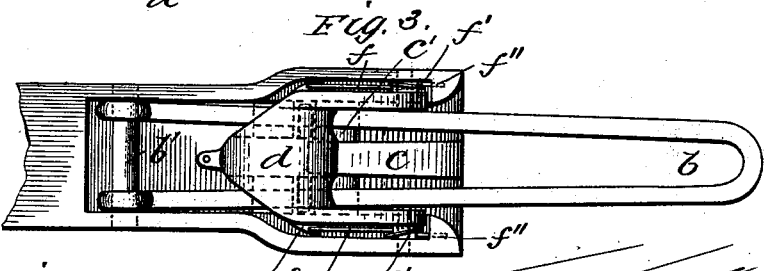
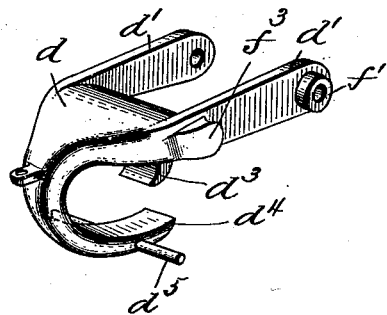
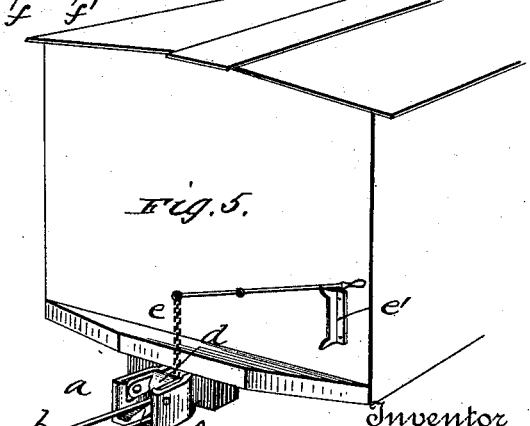
Witnesses
Chas. A. Mugyy.
Howard Walmsley.
Inventor
James E. Ament
By Alexander Davis
Attorneys
THE NATIONAL LITHOGRAPHING COMPANY,
WASHINGTON, D. C.

UNITED STATES PATENT OFFICE.

JAMES E. AMENT, OF CARROLL, IOWA, ASSIGNOR OF ONE-HALF TO FRANK W. BROOKS, OF BLANDINSVILLE, ILLINOIS.

CAR-COUPLING.

SPECIFICATION forming part of Letters Patent No. 508,797, dated November 14, 1893.

Application filed August 31, 1893. Serial No. 484,479. (No model.)

*To all whom it may concern:*

Be it known that I, JAMES E. AMENT, a citizen of the United States, residing at Carroll, in the county of Carroll and State of Iowa, have invented certain new and useful Improvements in Car-Couplings, of which the following is a specification, reference being had therein to the accompanying drawings, in which—

Figure 1 is a vertical section of one of the couplers. Fig. 2 is a similar view of two couplers coupled; Fig. 3 a plan of one of the couplers; Fig. 4 a detail perspective of the dog, and Fig. 5 a view of the end of a car showing the operating lever.

The object of this invention is to provide a strong and practical car coupling that shall be automatic in its coupling action and very durable in its construction; and it consists of certain novel features of construction fully hereinafter described and pointed out in the claims.

In the drawings, $a$ designates the draw-head, which is provided with a large recess in its upper end for the reception of the coupling devices. The coupling devices in each draw-head consist of a long link $b$ lying normally in the bottom of the recess and having its rear end pivoted permanently on a horizontal pin $b'$ supported in the rear end of the recess. Formed on the bottom of the recess or mouth of the draw-head is a rib or lug $c$, which extends up between the side-bars of the link a suitable distance and which has its front or upper edge $c'$ beveled downwardly and forwardly to the front edge of the draw-head and its rear edge beveled slightly forwardly, forming a sort of hook. In the bottom of the draw-head are formed the projections $c''$, one being arranged on each side of hook $c$, and adapted to support the link and hold it in position for entrance into the adjacent draw-head.

The coupling-dog $d$ is provided with a pair of forwardly-projecting side-arms $d'$ $d'$, which rest in recesses formed in the respective sides of the draw-head and are pivoted therein at their forward ends on pivots $d''$. The dog is also provided with a short hook-like formation $d^3$ which depends from a point midway between the arms and rests on the upper end of the hook $c$, said hook $d^3$ being curved downwardly and rearwardly. On the rear end of the dog is formed an arm $d^4$, which curves rearwardly and downwardly and then forwardly, terminating close behind the hook $c$ and passing down between the side-bars of the link and provided with a horizontal pin $d^5$ engaging under the link. This dog may be raised in uncoupling by any suitable means, a chain and lever $e$ being shown, the latter being pivoted on a convenient part of the car and extending to the side thereof. A plate $e'$ is secured on the car to engage the lever and support it when coupled or hold the devices in an uncoupled position whenever desired, as is obvious from the drawings. Should the weight of the dog not be sufficient to keep it normally in place, suitable springs may be employed to assist in holding it down. For instance, springs $f$ are preferably secured to the arms $d'$ and located between the same and the adjacent parts of the draw-head to be out of harm's way. The springs are each coiled around the lug $f'$, formed around the pivot of each of the arms and one end of the spring is secured to the draw-head at $f''$ and the other end engaged over a lug $f^3$ on the dog, which construction is very simple and durable.

In coupling, the lower one of the links rides up the rib or hook $c$, raises the dog by striking the beveled front edge of hook $d^3$, and then drops down behind said rib or hook $c$, permitting the dog to resume its normal position; the upper one of the links impinges against the forward end of the lower link and is thereby raised out of the way, as shown in Fig. 2. In uncoupling, it is simply necessary to raise the coupled dog, whose hook $d^4$ then engages under the coupled link and lifts it off the stationary hook or rib $c$ and leaves it free to be withdrawn.

Having thus fully described my invention, what I claim is—

1. The combination of a draw-head having a beveled stationary hook $c$ formed in its bottom, a link pivoted therein, a movable dog in the draw-head provided with a depending hook $d^3$, extending to or nearly to said stationary hook *e*, and an arm extending down between the sides of the link and terminating behind hook *c*, substantially as described.

2. The combination of a draw-head, a permanent beveled hook *c* therein, a pivoted link embracing the hook, and a dog provided with two arms pivoted on the opposite sides of the draw-head, said dog being also provided with a downwardly and forwardly-extending arm $d^4$, terminating behind hook *c* and provided with a lateral pin engaging under the link, substantially as described.

3. The combination of a draw-head, a permanent beveled hook *c* therein, a pivoted link embracing the hook, and a dog provided with two arms pivoted on the opposite sides of the draw-head, said dog being also provided with a downwardly and forwardly extending arm $d^4$ terminating behind hook *c* and provided with a lateral pin engaging under the link, and springs for keeping said dog depressed, substantially as described.

In testimony whereof I affix my signature in presence of two witnesses.

JAMES E. AMENT.

Witnesses:
  LENA GUAUR,
  G. M. LISK.